United States Patent [19]

Kawai

[11] Patent Number: 5,436,518
[45] Date of Patent: Jul. 25, 1995

[54] MOTIVE POWER GENERATING DEVICE

[75] Inventor: Teruo Kawai, 4-3-905, Nishikamata 7-chome, Ota-ku, Tokyo, Japan

[73] Assignees: Nihon Riken Co., Ltd.; Teruo Kawai, both of Tokyo, Japan

[21] Appl. No.: 79,120

[22] Filed: Jun. 17, 1993

Related U.S. Application Data

[63] Continuation-in-part of Ser. No. 816,821, Jan. 3, 1992, abandoned.

[51] Int. Cl.$^6$ .................. H02K 7/02; H02K 7/075
[52] U.S. Cl. .................. 310/156; 310/68 B; 318/135
[58] Field of Search .......... 310/68 R, 68 B, 70 R, 310/152, 156, 184, 12, 81; 318/498, 135

[56] References Cited

U.S. PATENT DOCUMENTS

| | | | |
|---|---|---|---|
| 3,344,325 | 9/1967 | Sklaroff | 318/138 |
| 3,411,059 | 11/1968 | Kaiwa | 318/138 |
| 3,473,061 | 10/1969 | Soehner et al. | 310/156 |
| 3,555,380 | 1/1971 | Hings | 318/135 |
| 3,577,053 | 5/1971 | McGee | 318/254 |
| 3,707,638 | 12/1972 | Nailen | 310/152 |
| 4,095,161 | 6/1978 | Heine et al. | 318/696 |
| 4,306,164 | 12/1981 | Itoh et al. | 310/49 R |
| 4,347,457 | 8/1982 | Sakamoto | 310/256 |
| 4,357,551 | 11/1982 | Dulondel | 310/46 |
| 4,406,958 | 9/1983 | Palmero et al. | 310/49 R |
| 4,633,108 | 12/1986 | von der Heide | 310/12 |
| 4,712,028 | 12/1987 | Horber | 310/49 R |
| 4,719,378 | 1/1988 | Katsuma et al. | 310/67 R |
| 4,728,837 | 3/1988 | Bhadra | 310/80 |
| 4,774,440 | 9/1988 | Bhadra | 310/81 |
| 4,786,834 | 11/1988 | Grant et al. | 310/194 |
| 4,870,306 | 9/1989 | Petersen | 310/12 |
| 5,023,495 | 6/1991 | Ohsaka et al. | 310/12 |
| 5,030,866 | 7/1991 | Kawai | 310/82 |
| 5,105,111 | 4/1992 | Luebke | 310/46 |
| 5,191,255 | 3/1993 | Kloosterhouse et al. | 310/156 |
| 5,192,899 | 3/1993 | Simpson et al. | 318/139 |
| 5,258,697 | 11/1993 | Ford et al. | 318/498 |

FOREIGN PATENT DOCUMENTS

| | | |
|---|---|---|
| 0082356 | 6/1983 | European Pat. Off. |
| 0411563A1 | 2/1991 | European Pat. Off. |

OTHER PUBLICATIONS

IBM Technical Disclosure Bulletin, Wound Rotor Incremental Motor, P. J. Davies et al, vol. 12, No. 12, May 1970, p. 2130.

Primary Examiner—Thomas M. Dougherty
Assistant Examiner—D. R. Haszko
Attorney, Agent, or Firm—Flynn, Thiel, Boutell & Tanis

[57] ABSTRACT

A motive power generating device comprises a permanent magnet disposed around a rotational output shaft for rotation therewith, the output shaft being mounted on a support member for rotation, a magnetic body disposed in concentric relationship with the permanent magnet for rotation with the rotational output shaft, the magnetic body being subjected to magnetic flux generated by the permanent magnet, a plurality of electromagnets fixedly mounted to the support member in such a manner that they are spaced at predetermined distances around the periphery of the magnetic body, each magnetic circuit of the electromagnets being adapted to be independent of one another, and excitation change-over means for the electromagnets, the excitation change-over means being adapted to sequentially magnetize one of the electromagnets which is positioned forwardly with regard to a rotational direction of the rotational output shaft, so as to impart to the particular electromagnet a magnetic polarity opposite to that of the magnetic pole of the permanent magnet, whereby magnetic flux passing through the magnetic body converges in one direction so as to apply a rotational torque to the rotational output shaft. No force opposing movement of a rotor or movable element is generated.

16 Claims, 19 Drawing Sheets

MOTIVE POWER GENERATING DEVICE

This application is a Continuation-in-Part of application Ser. No. 07/816,821 filed on Jan. 3, 1992, now abandoned.

BACKGROUND OF THE INVENTION

This invention relates to a motive power generating device in which electromagnets and a combination of a magnetic material and a permanent magnet are used as a stator and a rotor, respectively. More particularly, the invention relates to a motive power generating device which transforms magnetic energy into operative energy with maximum efficiency utilizing a magnetic force inherent in a permanent magnet as an energy source.

Heretofore, it has been known in the art that a motive power generating device in which electromagnets and a combination of a magnetic material, such as soft steel, and a permanent magnet are used as a stator and a rotator, respectively. Such a device includes, for example, a step motor of a HB (Hybrid) type.

FIGS. 12 to 17 diagrammatically illustrate an example of conventional HB type step motors. The HB type motor is characterized by a rotor 52, as shown in FIGS. 12 and 13. The rotor combines the advantageous feature of a step motor of a VR (Variable Reluctance) type in that a smaller step angle may be obtained by virtue of the teeth formed in a laminated steel plate 53 constituting one component of the rotor, with the advantageous feature of a step motor of a PM (Permanent Magnet) type in that a high degree of efficiency and miniaturization may be obtained by virtue of the permanent magnet 54 constituting the other component of the rotor 52. It is to be noted here that the steel core of the stator 50 is the same as that of a VR type motor, but the method of winding and connecting the coils is different.

FIG. 14 shows a passage of magnetic flux (magnetic path) created by the permanent magnet 54. The magnetic path represents a distribution of a uni-polar type in which an N-pole or S-pole uniformly appears at the axial ends of a rotor shaft 55. On the other hand, FIG. 15 shows a magnetic path created by the electromagnets 51 of the rotor 50. The magnetic path represents a distribution of a hereto-polar type in which an even number of magnetic poles in the order, for example, of NSNS ... appear in a plate vertical to the rotor shaft 55. The uni-polar magnetic flux of the permanent magnet (magnetic field of the permanent magnet) and the hereto-polar magnetic flux of the windings (magnetic field of the electromagnet) interact with each other so as to generate a torque. The term "interaction between the magnetic flux of the permanent magnet and the magnetic flux of the windings" is used herein to mean that an inclination of the line of magnetic force is created in the gap between the permanent magnet 54 and the electromagnet 51.

A torque generating mechanism of the HB type motor will be explained with reference to FIGS. 16 and 17 illustrating a model developed into a form of a linear motor. FIG. 16 shows a cross-section of S-side (south pole side) of the permanent magnet 54, while FIG. 17 shows a cross-section of N-side (north pole side) of the permanent magnet. In these drawings, magnetic flux emanating from the electromagnets 51 is shown by solid lines, and magnetic flux emanating from the permanent magnet 54 is shown by dotted lines.

With regard to the magnetic field from the electromagnets 51 (refer to the solid line in FIGS. 16), the S-side cross-section of the permanent magnet 54 shows that the line of magnetic force in the central gap is inclined in the downward and right hand direction, while the line of magnetic force in the right hand end gap is inclined in the upward and right-hand direction. Thus, the lines of magnetic force in the above two gaps tend to cancel each other out. The same relationship is applied to the cross section of the N-side (north pole side) of the permanent magnet 54.

It is noted that torque will be generated when the magnetic field of the electromagnet 51 and the magnetic field of the permanent magnet 54 interact with each other. Specifically, and with regard to the central gap in the S-side cross-section of the permanent magnet 54, i.e., N-side of the electromagnet 51, the magnetic field of the electromagnet 51 and the magnetic field of the permanent magnet 54 interact with each other strongly in the same direction so as to generate in the rotor 52 a propulsive force toward the left in FIG. 16. On the other hand, and with regard to the right-hand gap, i.e., S-side of the electromagnet 51, both magnetic fields interact with each other weakly in opposite directions, so as to generate a propulsive force toward the right in FIG. 16. It is noted, however, that the propulsive force generated toward the right in FIG. 16 is relatively small. Consequently, a stronger propulsive force toward the left in FIG. 16 is generated.

With regard to the central gap in N-side cross-section of the permanent magnet 54, i.e., N-side of the electromagnet 51, the magnetic field of the electromagnet 51 and the magnetic field of the permanent magnet 54 interact with each other weakly in opposite directions, so as to generate in the rotor 52 a propulsive force toward the right in FIG. 17. The resultant propulsive force is relatively small. On the other hand, and with regard to the right-hand gap in FIG. 17, i.e., S-side of the electromagnet 51, both magnetic field interact strongly with each other in the same direction, so as to generate a propulsive force of relatively significant magnitude toward the left in FIG. 17. Consequently, a stronger propulsive force toward the left in FIG. 17 will be generated. Accordingly, the thus generated propulsive force causes the rotor to be advanced in the left-hand direction in FIGS. 16 and 17.

It should be noted, however, that such a conventional HB type motor involves a problem in that a force acting in an opposite direction to the torque (a force tending to interfere with rotation of the rotor 52) is generated as mentioned above. In view of electrical energy to be applied to the windings of the electromagnets 51, an electric current applied to the winding of the right-hand end electromagnet in FIG. 16 and the winding of the central electromagnet in FIG. 17 is merely consumed so as to cancel the magnetic field of the permanent magnet which tends to prevent rotation of the rotor 52. Thus, such an electric current does not effectively contribute at all to the movement of the rotor 54, thus decreasing energy efficiency. In view of the magnetic energy of the permanent magnet 54, such energy is utilized together with the magnetic field created by the electromagnet 51, but it partly interferes with the movement of the rotor 52. Thus, magnetic energy of the permanent magnet 54 is not effectively utilized.

The above problem experienced with the HB type motor applies equally to motive power generation devices in which an electromagnet is used as a stator and soft steel and a permanent magnet is used as a rotor.

SUMMARY OF THE INVENTION

Accordingly, it is an object of the invention to provide a motive power generation device in which the occurrence of a force acting in a direction opposite to the direction of movement of a rotor and/or a stator is prevented, so as to permit efficient use of electric energy to be applied to electromagnets, as well as magnetic energy generated by a permanent magnet.

In order to achieve the above object, the first invention comprises a permanent magnet disposed around a rotational output shaft for rotation therewith, the output shaft being mounted on a support member for rotation, a magnetic body disposed in concentric relationship with the permanent magnet for rotation with the rotational output shaft, the magnetic body being subjected to the magnetic flux of the permanent magnet, a plurality of electromagnets fixedly mounted to the support member in such a manner that they are spaced a predetermined distance around the periphery of the magnetic material, each magnetic circuit of the electromagnets being adapted to be independent of one another and the excitation change-over means of the electromagnets, the excitation change-over means being adapted to sequentially magnetize one of the electromagnets which is positioned forwardly with regard to a rotational direction of the rotational output shaft, so as to impart to the electromagnet a magnetic polarity magnetically opposite to that of the magnetic pole of the permanent magnet, whereby a magnetic flux passing through the magnetic body converges in one direction thereby applying a rotational torque to the rotational output shaft.

According to the first invention, when one of the electromagnets which is positioned forwardly in the rotational direction of the rotational output shaft, a magnetic field created by the excited electromagnet and a magnetic field created by the permanent magnet interact with each other. Thus, the magnetic flux passing through the magnetic body converges toward the excited electromagnet, so as to rotate the rotational output shaft by a predetermined angle toward the excited electromagnet. When the rotational output shaft has been rotated by the predetermined angle, the above excited electromagnet is de-magnetized, and another electromagnet currently positioned forwardly in the rotational direction of the rotational output shaft is excited or magnetized. Sequential excitation of the electromagnets in the above manner permits rotation of the output shaft in a predetermined direction. In this regard, it is noted that the electromagnets are excited to have a magnetic polarity opposite to that of the magnetic pole of the permanent magnet and that the magnetic circuit of the excited electromagnets is independent from those of adjacent electromagnets. Thus, the magnetic flux generated by the excited electromagnet is prevented from passing through magnetic circuits of adjacent electromagnets, which, if it occurs, might cause the electromagnets to be magnetized to have the same polarity as that of the magnetic pole of the permanent magnet. Accordingly, no objectionable force will be generated which might interfere with rotation of the output shaft.

In order to achieve the above object, the second invention comprises a permanent magnet mounted on a movable body arranged movably along a linear track, a magnetic body mounted on the permanent magnet, the magnetic body being subjected to a magnetic flux of the permanent magnet, a plurality of electromagnets spaced an appropriate distance along the linear track, said electromagnets having respective magnetic circuits which are independent of one another and excitation change-over means of the electromagnets, said excitation change-over means being adapted to sequentially magnetize one of the electromagnets which is positioned forwardly with respect to the direction of movement of the movable body, so as to impart to the excited electromagnet a magnetic polarity opposite to that of the magnetic pole of the permanent magnet, whereby a magnetic flux passing through the magnetic body converges in a predetermined direction so as to cause linear movement of the movable body.

According to the second invention, when the electromagnet positioned forwardly of the forward end of the movable body with regard to the direction of the movement of the movable body is excited, a magnetic field generated by the excited electromagnet and magnetic field generated by the permanent magnet interact with each other. Thus, a magnetic flux passing through the magnetic body converges toward the excited electromagnet, so as to displace the movable body a predetermined distance toward the excited electromagnet. When the movable body has been moved the predetermined distance, the movable body is positioned below the above excited electromagnet, and another electromagnet is positioned forwardly of the forward end of the movable body. When this occurs, excitation of the electromagnet positioned above the movable body is interrupted, and excitation of the electromagnet now positioned forwardly of the forward end of the movable body is initiated. Sequential excitation of the electromagnets in the above manner permits movement of the movable body in a predetermined direction. It is noted that no objectionable force which would interfere with movement of the movable body is created for the same reason as that explained in relation to the first invention.

DETAILED DESCRIPTION OF PREFERRED EMBODIMENTS

Preferred embodiments of the invention will be explained in detail below with reference to the attached drawings.

Figure 1:
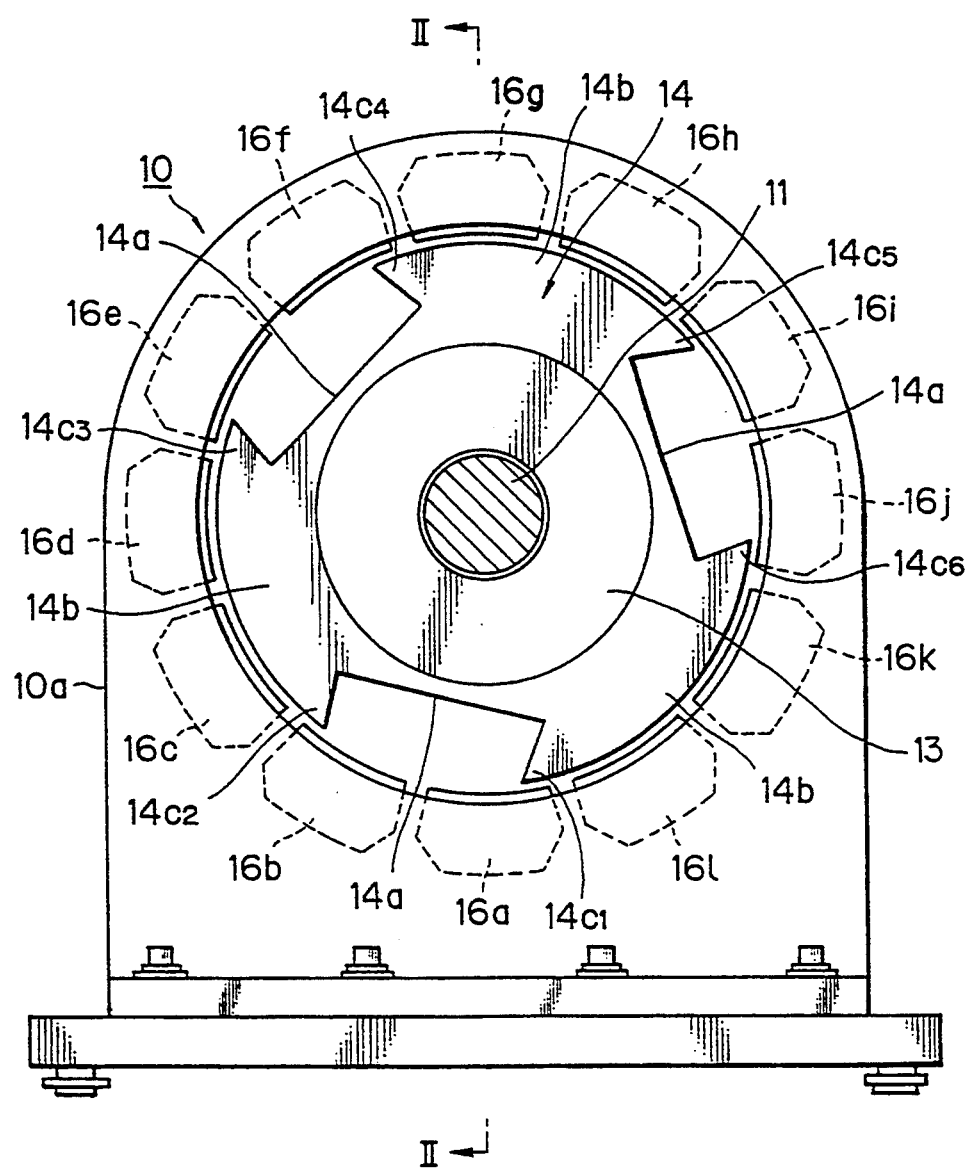
FIG. 1 is a front elevational view, partly in section and partly omitted, of a motor according to a first embodiment of the invention.
Figure 2:
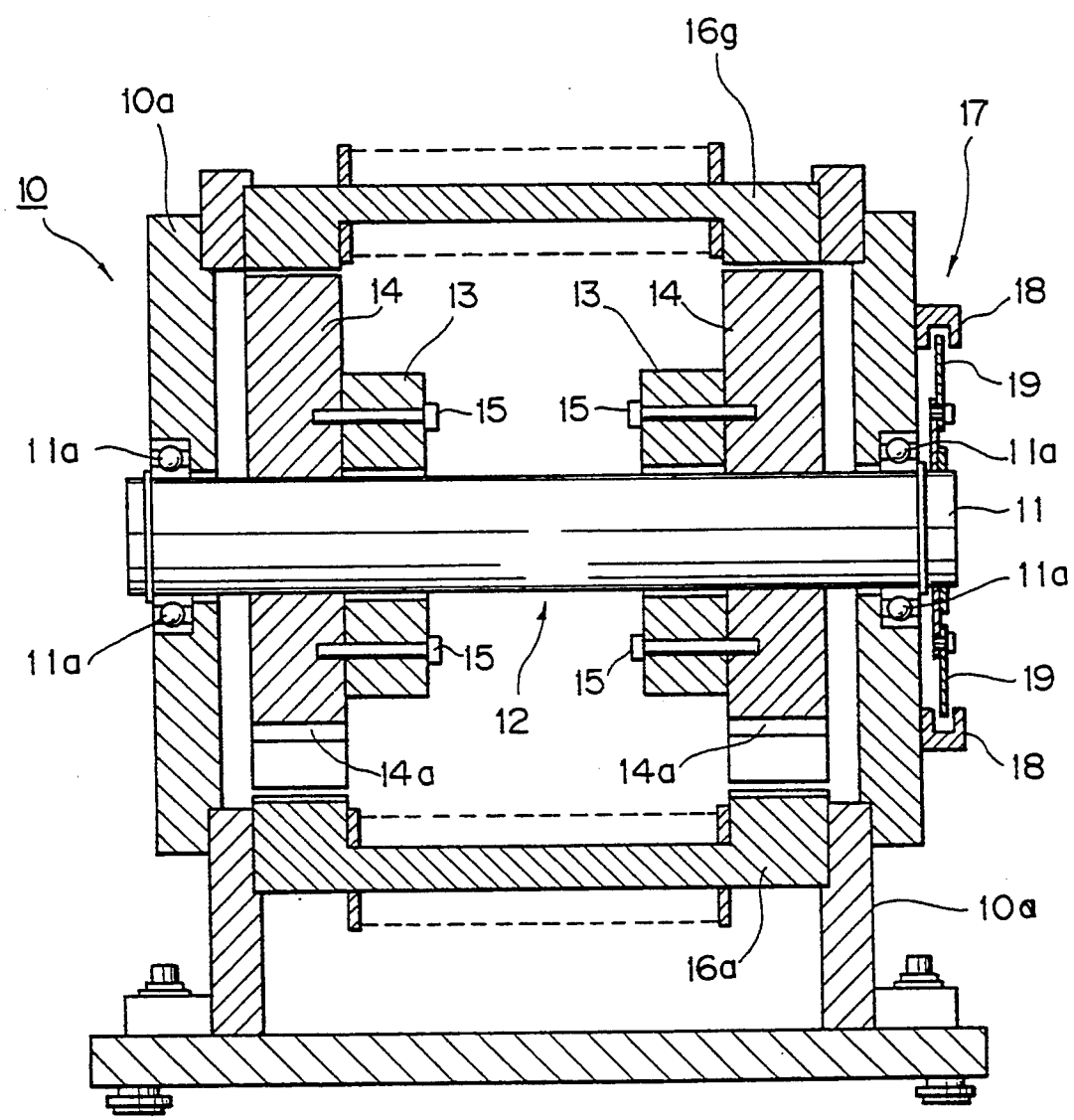
FIG. 2 is a sectional view along line II—II in FIG. 1.

According to a first embodiment of the invention, a rotational output shaft 11 is rotatably mounted between front and rear side plates 10a of a support member 10 through bearings 11a, as shown in FIGS. 1 and 2. Permanent magnets 13 in a ring form are freely fitted over the output shaft at the axially opposite ends thereof and axially inward of the respective side plates 10a for movement with the rotational output shaft 11. The permanent magnets are magnetized in the axial direction. A magnetic body 14 is fixedly mounted between each of the side plates 10a for the rotational output shaft 11 and the permanent magnets 13. Each magnetic body 14 includes alternately disposed notches 14a and magnetic teeth 14b. It is noted that flux of the permanent magnets 13 passes through the respective magnetic bodies 14. FIG. 1 shows that the magnetic body 14 is provided, for example, with three notches 14a and three magnetic teeth 14b. The permanent magnets 13 and magnetic bodies 14 are disposed coaxially with the rotational output shaft 11. The corresponding permanent magnets 13 and magnetic bodies 14 are combined together by means of connecting means such as bolts 15 so as to form a rotor 12. The rotor 12 is adapted to be rotated in unison with the rotational output shaft 11.

It is noted that the support member 10 and rotational output shaft 11 are both made from a non-magnetic material. The support member 10 may be formed, for example, from stainless steel, aluminum alloys, or synthetic resins, while the rotational output shaft 11 may be formed from stainless steel, for example. Thus, the magnetic circuit formed by the permanent magnet 13 and magnetic body at one axial end of the rotational output shaft 11 and the magnetic circuit formed by the permanent magnet 13 and magnetic body at the opposite axial end of the output shaft are independent of one another. The magnetic bodies 14 may be formed from magnetic materials having a high magnetic permeability, such as various kinds of steel materials, silicon steel plate, permalloys, or the like.

A plurality of electromagnets 16a through 16l, constituting the stator, are disposed between the side plates 10a. The electromagnets are equidistantly and fixedly disposed around the magnetic materials 14 so that they surround the magnetic bodies. As shown in FIG. 1, twelve (12) electromagnets may be disposed. The magnetic circuit of each of the electromagnets 16a through 16l is adapted to be independent from one another, so that no flux of magnetized electromagnets passes through the iron core of adjacent electromagnets.

The iron core of each of the electromagnets 16a through 16l extends in parallel with the axial direction of the rotational output shaft 11, permanent magnets 13 and magnetic bodies 14. The axially opposite ends (magnetic polar portion) of each of the iron cores are oppositely disposed relative to the peripheral surface of the magnetic bodies with a slight gap therebetween.

Some of the electromagnets 16a through 16l are disposed at a position corresponding to boundary portions 14c1 through 14c6 between the notch 14a and the magnetic tooth 14b. For example, as shown in FIG. 1, electromagnets 16a, 16b, 16e, 16f, 16i and 16j are positioned in an opposite relationship to the boundary portions 14c1, 14c2, 14c3, 14c4, 14c5, and 14c6, respectively.

Figure 5A:
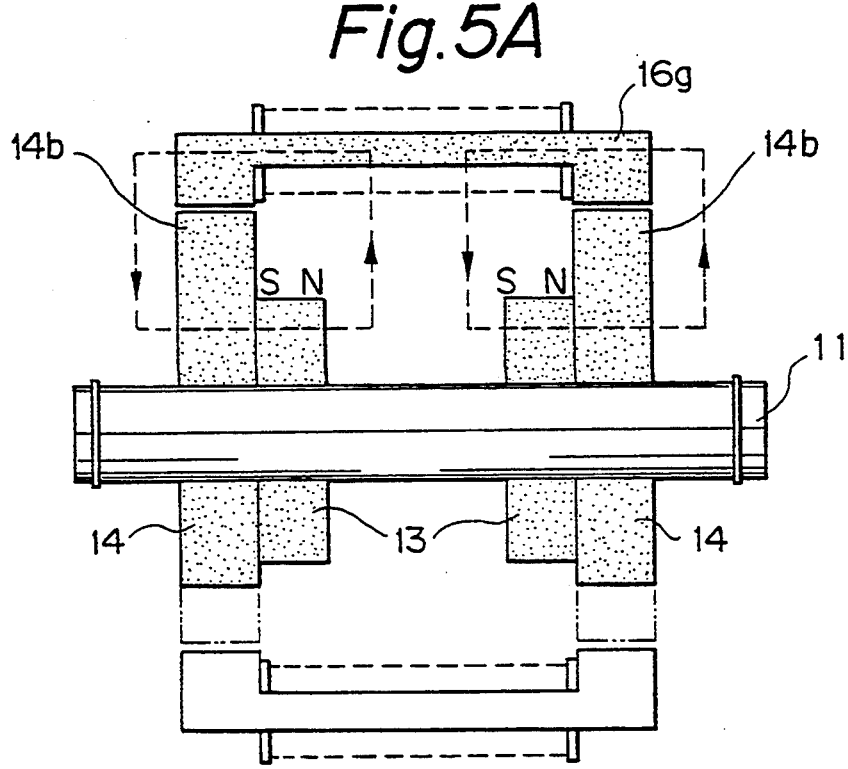
FIG. 5A is an illustrative view showing a magnetic path of magnetic flux created by a permanent magnet of the motor when the electromagnets are not magnetized.
Figure 5B:
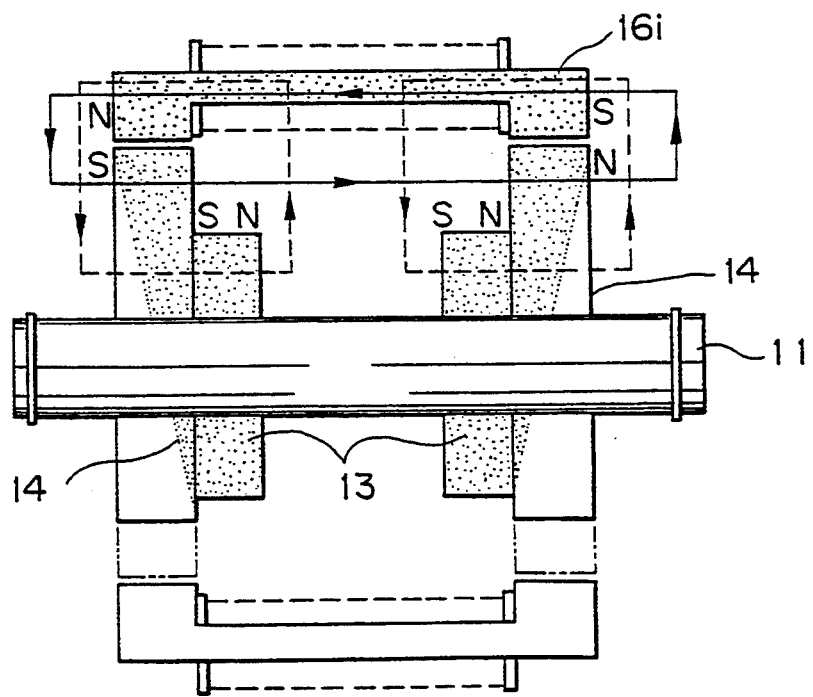
FIG. 5B is an illustrative view showing a magnetic path of magnetic flux created by the permanent magnet of the motor, as well as magnetic path of magnetic flux created by the electromagnets.

FIG. 5A shows a path of magnetic flux created by the permanent magnet 13 when the electromagnets are not excited or magnetized, while, FIG. 5B shows a path of magnetic flux created by the permanent magnet 13 and a path of magnetic flux created by the windings of the electromagnets when the electromagnets are magnetized. As will be clear from FIGS. 5A and 5B, both paths of magnetic flux represent a uni-polar distribution in which N-pole or S-pole evenly appears at the opposite axial ends. When the electromagnets are magnetized, the magnetic fields of the permanent magnet and electromagnets cooperate or interact with each other so as to generate a rotational torque.

Excitation change-over means 17 for sequentially exciting or magnetizing the electromagnets 16a through 16l is basically consisted of a conventional excitation circuit for supplying direct current to each windings of the electromagnets 16a through 16l. In this embodiment, the change-over portion for changing electric feed to the electromagnets 16a through 16l includes a plurality of optical sensors 18 and a light shield plate 19 for turning the optical sensors ON and OFF.

The optical sensors 18 are spaced apart from one another with a space therebetween for permitting the light shield plate 19 to pass through a light emitting element and a light receiving element. The optical sensors 18 are disposed in the outer surface of one of the side plates 10a in equidistal relationship in the circumferential direction thereof, so that they are positioned to correspond to the electromagnets 16a through 16l (for example, the optical sensor 18 is shown to be disposed in the outer surface of the rear side plate). The light shielding plate 19 is fixed to the rotational output shaft 11 at the end thereof, the light shielding plate protruding from the rear side plate 10a on which the optical sensors are disposed.

According to the illustrated embodiment, when a particular optical sensor 18 is blocked by the light shielding plate 19, the electromagnet corresponding to such optical sensor 18 is supplied with electricity.

The operation of the first embodiment described above will be explained with reference to FIGS. 4A through 4H.

When the electromagnets 16a through 16l are not supplied with electricity by means of the excitation changeover means 17, the electromagnets 16c, 16d, 16g, 16h, 16k and 16l opposed to the magnetic teeth 14b with a small gap therebetween merely serve as a magnetic material disposed within the magnetic field of the permanent magnet 13 (refer to shaded portion in FIG. 4A), so as to absorb the magnetic teeth 14b thereto, and the rotor 12 remains stationary.

Figure 4A:
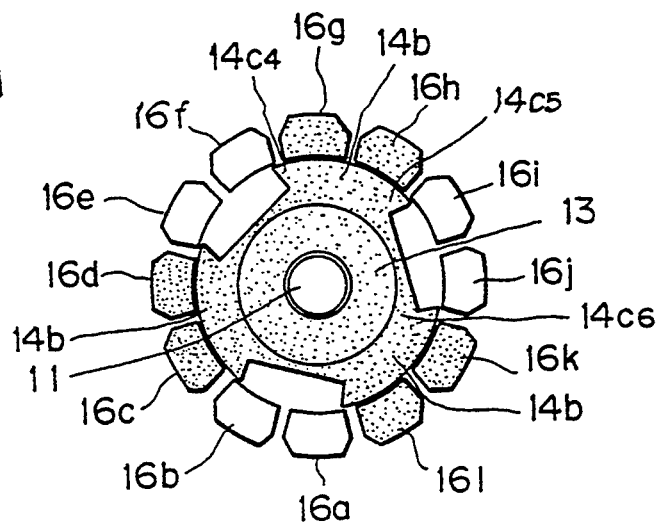
FIGS. 4A through 4H illustrate operation of the motor when the electromagnets are excited or magnetized.
Figure 4B:
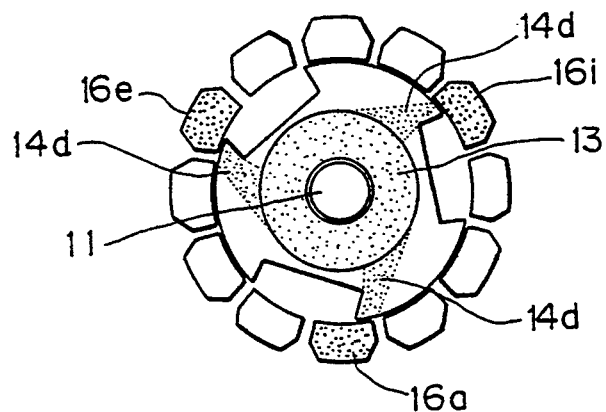
Figure 4C:
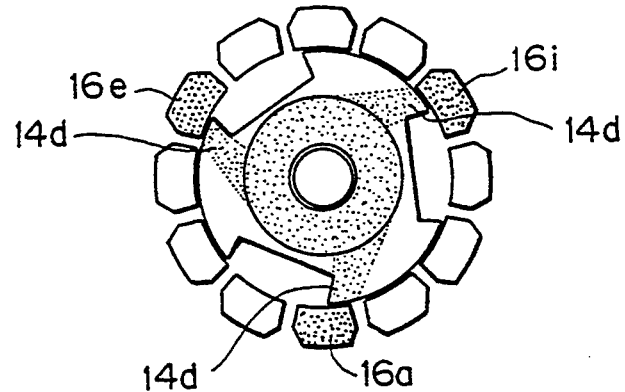
Figure 4D:
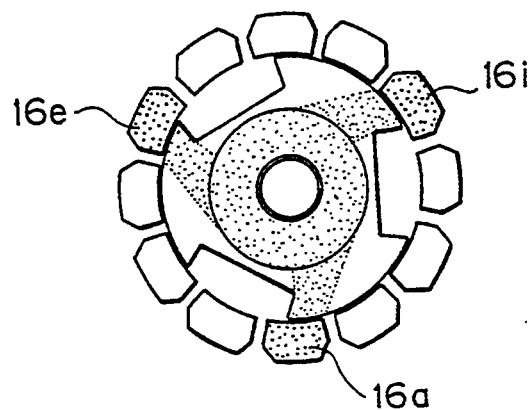
Figure 4E:
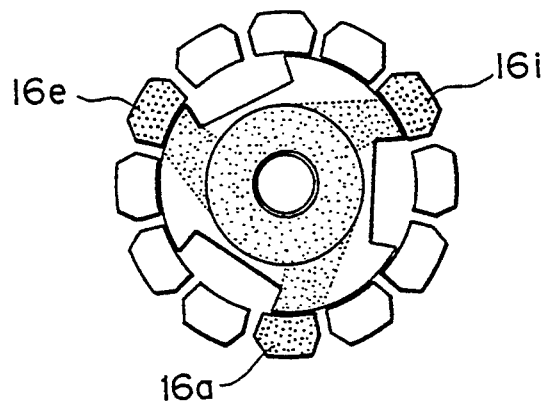
Figure 4F:
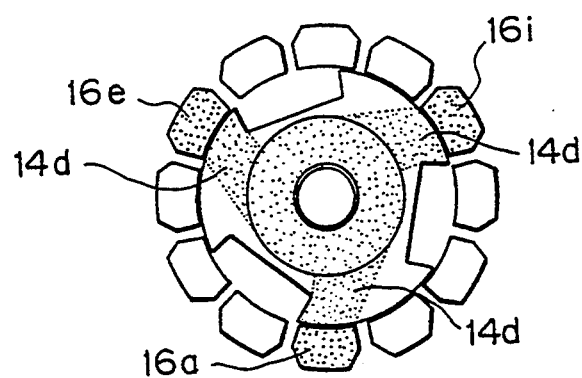
Figure 4G:
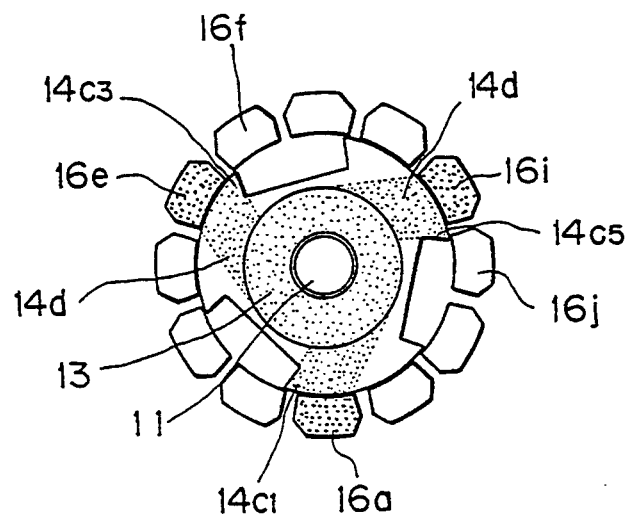

When the electromagnets 16a, 16e and 16i positioned adjacent to the boundary portion 14c1, 14c3 and 14c5 formed between the respective notches 14a and the magnetic teeth 14b are magnetized or excited simultaneously by means of the excitation change-over means, as shown in FIG. 4B, the magnetic field of the permanent magnet 13 and the magnetic fields of the electromagnets 16a, 16e and 16i interact with each other, so that a magnetic flux 14d passing through the magnetic body 14 instantaneously converges to the electromagnets 16a, 16e, and 16i. In this way, the rotor 12 is imparted with a rotational torque in a direction in which the magnetic flux 14d will be widened, i.e., counterclockwise direction as viewed in FIG. 4B.

FIGS. 4C through 4G illustrate change in the width of the magnetic flux 14d in accordance with rotation of the rotor 12. When the width of the magnetic flux becomes maximized, i.e., when only the magnetic teeth 14b are opposed to the electromagnets 16a, 16e and 16i, while the notches 14a are displaced completely away from the electromagnets 16a, 16e and 16i, the width of the magnetic flux 14d is maximized. Thus, an absorption force acting between the permanent magnet 13 and the electromagnets 16a, 16e and 16i is maximized. On the other hand, the rotational torque acting on the rotor 12 becomes zero.

Figure 4H:
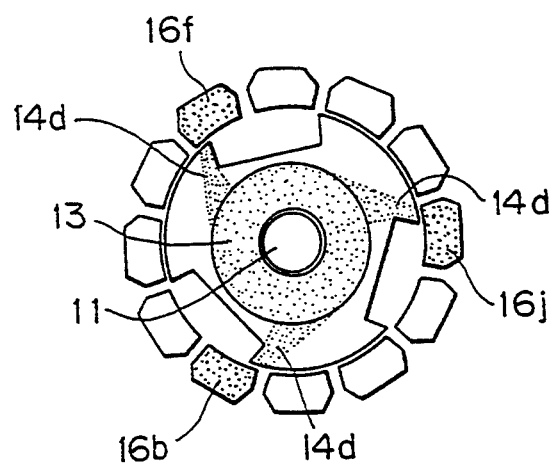

Before the rotational torque acting on the rotor 12 becomes zero, i.e., as the boundary portion 14c1, 13c3 and 14c5 approach another electromagnets 16b, 16f and 16j positioned forwardly in regard to the rotational direction, respectively, the electromagnets 16a, 16e and 16i are demagnetized and the electromagnets 16b, 16f and 16j are excited or magnetized by means of the excitation change-over means 17. Thus, the magnetic flux 14d converges toward the electromagnets 16b, 16f and 16j, as shown in FIG. 4H, so that a rotational torque acts upon the rotor, as described above.

Then, the electromagnets 16c, 16g and 16k are excited. When the boundary portion 14c1, 14c3 and 14c5 approach another electromagnets 16d, 16h and 16l positioned forwardly in regard to the rotational direction, in response to rotation of the rotor 12, the electromagnets 16c, 16g and 16k are de-magnetized and the electromagnets 16d, 16h and 16l are energized or excited.

As explained above, sequential excitation or energizing of the electromagnets 16a through 16l causes interaction between the magnetic flux of the permanent magnet 13 and the electromagnets 16a through 16l, whereby a rotational torque is applied to the rotor 12.

When this occurs, a rotational torque is generated between one of the magnetic poles of the permanent magnet 13 (for example, N-pole) and the magnetic poles (for example, S-poles) of the electromagnets 16a through 16l positioned at their respective axial ends. A rotational torque is also generated between the other magnetic pole (for example, S-pole) of the permanent magnet 13 and the other magnetic pole (for example, N-pole) of each of the electromagnets 16a through 16l positioned at the other axial end.

It is noted that, at one magnetic pole, for example N-pole, of the permanent magnet 13, certain of the electromagnets 16a through 16l are magnetized only to S-pole, thus preventing formation of a magnetic circuit, due to passage of magnetic flux from the excited electromagnets through adjacent electromagnets, which tends to bring about N-poles magnetically similar to the permanent magnet 13. It is also noted that, at the other magnetic pole, for example S-pole, of the permanent magnet 13, certain of the electromagnets are magnetized only to N-pole, thus preventing formation of a magnetic circuit, due to passage of magnetic flux from the excited electromagnets through adjacent electromagnets, which tends to bring about S-poles magnetically similar to the permanent magnet 13. The magnetic flux of the permanent magnet 13 passes through the magnetic bodies 14 so as to be converged to the excited electromagnets (refer to the magnetic flux 14d shown in FIGS. 4 through 4H), thus forming dead zones, through which no magnetic flux passes, in the magnetic bodies 14 at a position opposite to the un-excited electromagnets. Accordingly, no force is generated which tends to prevent rotation of the rotor 12.

In view of electric energy applied to the electromagnets 16a through 16l, substantially all the electric energy having been applied thereto is consumed so as to effectively contribute to the rotation of the rotor 12. On the other hand, and in view of magnetic energy of the permanent magnet 18, substantially all the magnetic energy is effectively utilized to contribute to the rotation of the rotor 12.

It is also noted that, since the notches 14a and the magnetic teeth 14b are alternately disposed in the outer periphery of the magnetic materials 14 in an acute angle configuration seen in FIGS. 4a–4h, and the electromagnets are disposed at a position each corresponding to the boundary portions between the notches and the magnetic teeth, it is possible for the line of the magnetic force, generated in each gap between the boundary portions and the electromagnets when the electromagnets are excited, to be inclined to a substantial degree, so that a sufficient degree of rotational torque may be obtained upon initial excitation of the electromagnets.

Figure 3:
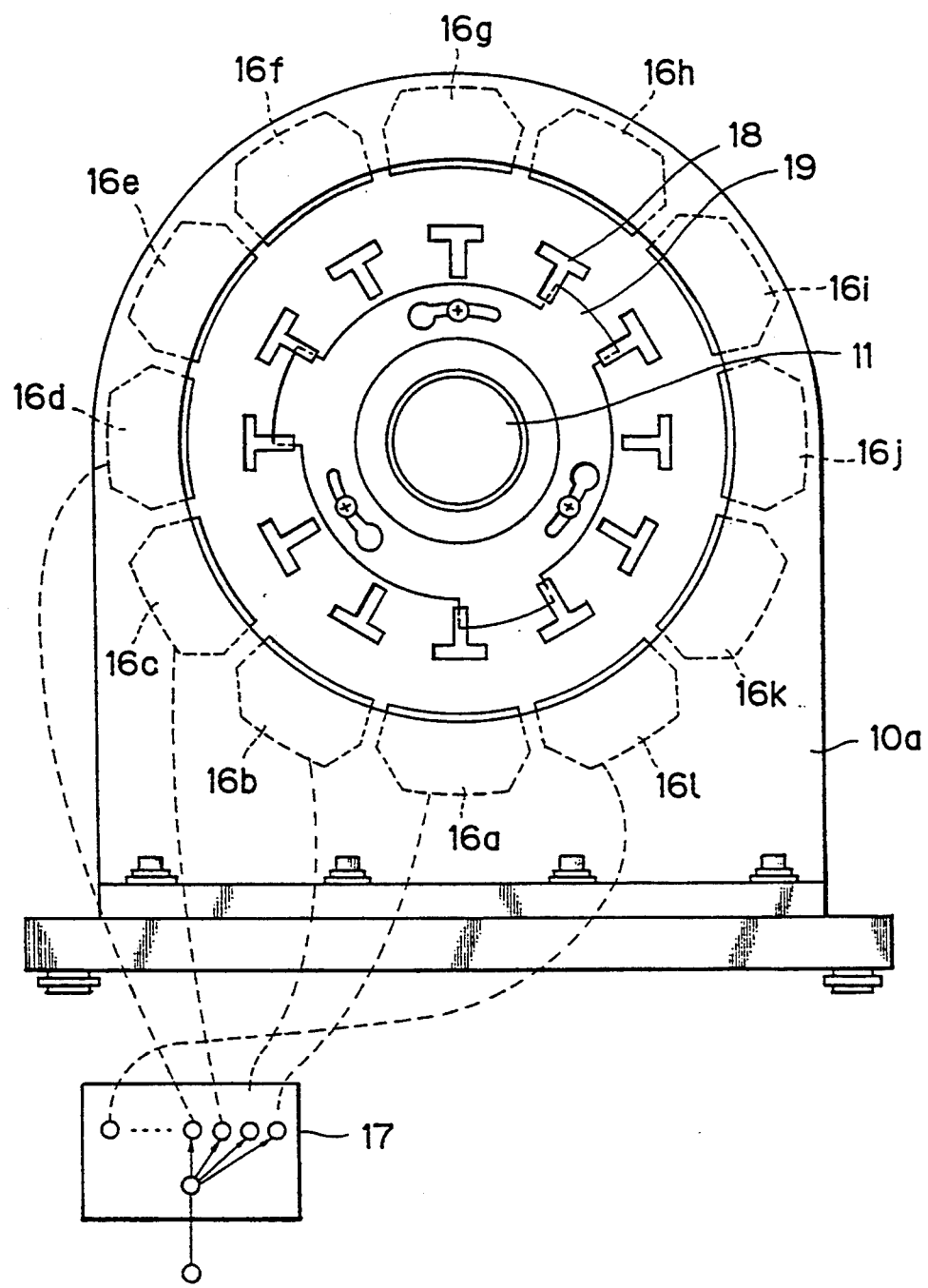
FIG. 3 is a rear elevational view of the motor provided with a light shield plate thereon.

The result obtained during an actual running test of the motor according to the first embodiment is shown in FIGS. 1 to 3.

Pure steel was used as a magnetic material. The magnetic material was 30 mm in thickness and formed to have magnetic teeth of 218 mm diameter and notches of 158 mm diameter. A ferritic magnet was used as a permanent magnet. The magnetic force of the magnet was 1,000 gauss. Electric power of 19.55 watts was applied to the electromagnets at 17 volts and 1.15 amperes. Under the above condition, a rotational number of 100 rpm, a torque of 60.52 Kg-cm and an output of 62,16 watt were obtained.

Alternative embodiments will be explained below with reference to FIGS. 6 through 9.

Figure 6:
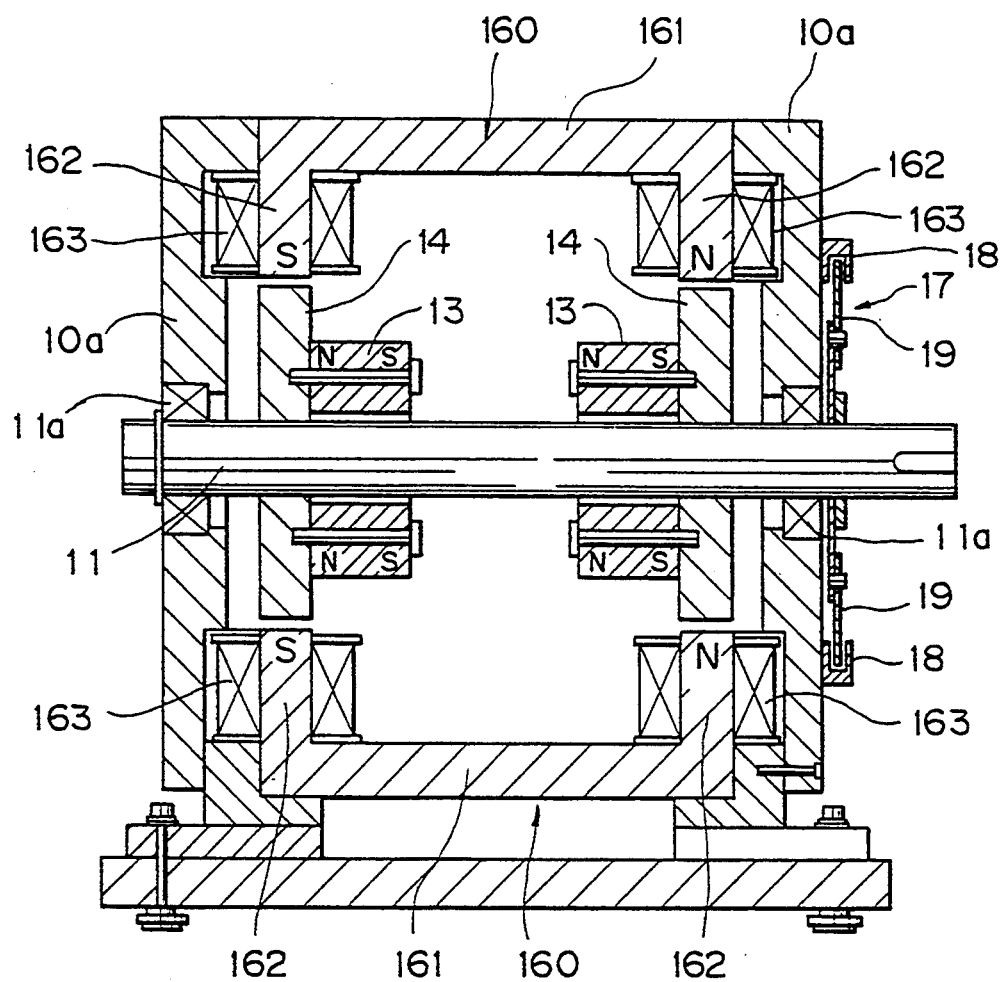
FIGS. 6 through 9 are cross-sectional view illustrating a modified form the motor.

The modified embodiment shown in FIG. 6 is similar to the motor according to the first embodiment as shown in FIGS. 1 through 3, with the exception that each electromagnet 160 to form the stator comprises an iron core 161 having a pair of legs 162 disposed at opposite axial ends thereof and extending toward the outer periphery of the magnetic bodies (outer periphery of the magnetic teeth 14b), each of the legs being wound with respective coils 163. The remaining components are basically identical to those in the motor shown in FIGS. 1 through 3. In FIG. 6, the components similar to those in FIGS. 1 through 3 are denoted by like reference numerals. It is noted that each coil 163 is supplied with electricity so that one leg 162 disposed at one axial end (left-hand side in FIG. 6) of each of the iron cores 161 is magnetized to be S-pole which is magnetically opposite to the magnetic pole (N-pole) of the confronting magnetic body 14, while the leg 162 disposed at the other end of each of the iron cores is magnetized to be N-pole which is magnetically opposite to the magnetic pole (S-pole) of the confronting magnetic body 14.

According to this modified embodiment, it is possible to significantly reduce leakage of the magnetic flux created by the electromagnets 160 in gaps each defined between the surfaces of the magnetic poles of the electromagnets 160 and the outer peripheries of the magnetic teeth 14b of the magnetic bodies 14.

Figure 7:
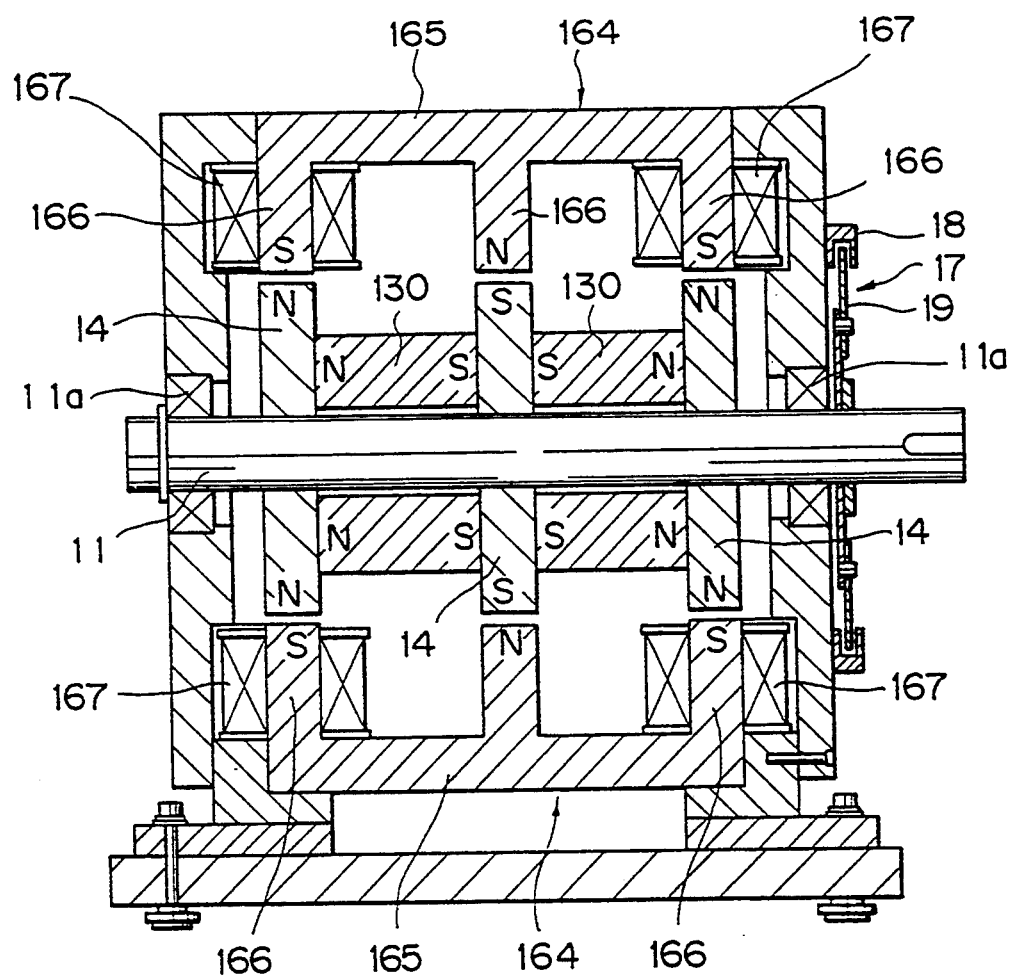

An alternative embodiment shown in FIG. 7 is similar to the motor shown in FIGS. 1 through 8, with the exception that: an additional magnetic body 14 is mounted on the rotational output shaft 11 at the axial midpoint thereof; two permanent magnets 130 are freely mounted on the output shaft 11 in a manner shown in FIG. 6; and each iron core 165 is provided with three legs 166 positioned at the opposite axial ends and midpoint thereof and extending toward the respective outer periphery of the magnetic bodies, with the legs 166 positioned at axial opposite ends of the respective iron cores 165 being wound with a coil 167, whereby forming electromagnets 164. The remaining components are substantially the same as those in the motor shown in FIGS. 1 through 3. It is noted here that the rotational output shaft 11 may be formed from magnetic materials or non-magnetic materials.

As shown in FIG. 7, each of the coils 167 is supplied with electricity so that the legs 166 positioned at the opposite axial ends of each of the iron cores 164 is magnetized to be S-pole which is magnetically opposite to the magnetic pole (N-pole) of the confronting magnetic body 14. By this, the leg 166 positioned at the midpoint of the iron core 165 is magnetized to be N-pole which is magnetically opposite to the magnetic pole (S-pole) of the confronting magnetic body 14.

In this embodiment, it is also possible, as in the modified embodiment shown in FIG. 6, to significantly reduce leakage of magnetic flux generated by the electromagnets 164. In addition to this, it is also possible to obtain a rotational torque between the leg 166 positioned at the midpoint of the iron core and the magnetic body 14 positioned at the axial midpoint of the rotational output shaft 11. Accordingly, a higher rotational torque may be obtained with the same amount of electrical consumption, in comparison with the embodiment shown in FIG. 6.

Figure 8:
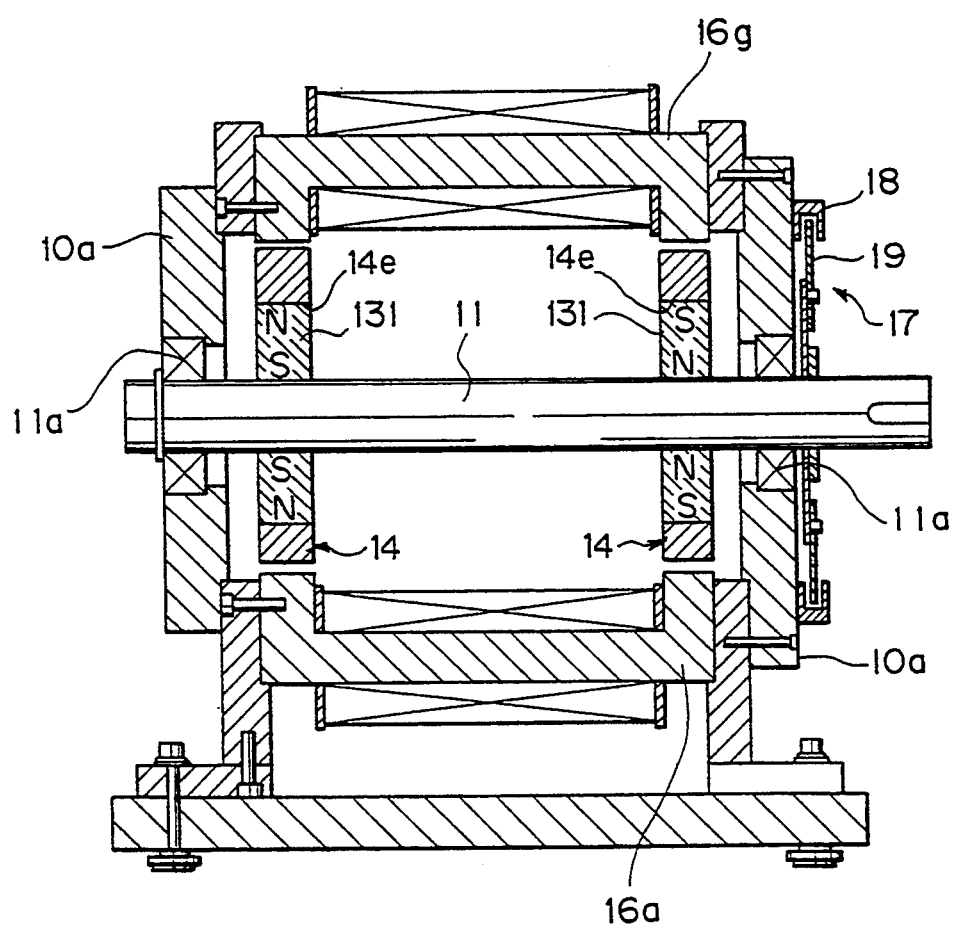

A further embodiment shown in FIG. 8 is similar to the motor shown in FIGS. 1 though 3, with the exception that a permanent magnet magnetized in the radial direction, rather than in the axial direction is employed. The permanent magnet 131 of an annular configuration has, for example, N-pole in the outer periphery and S-pole in the inner periphery. The permanent magnet 131 is received within a cavity 14e provided in the respective magnetic body 14 at the intermediate portion thereof as disposed at the opposite axial ends of the rotational output shaft 11. The remaining components are identical to those in the motor shown in FIGS. 1 to 3. The components identical to those in the motor shown in FIGS. 1 to 3 are denoted by the same reference numerals. It is noted that this embodiment may also employ the electromagnets 160 shown in FIG. 6.

In this embodiment, the rotational output shaft 11 may be formed from magnetic materials, rather than non-magnetic materials.

Figure 9:
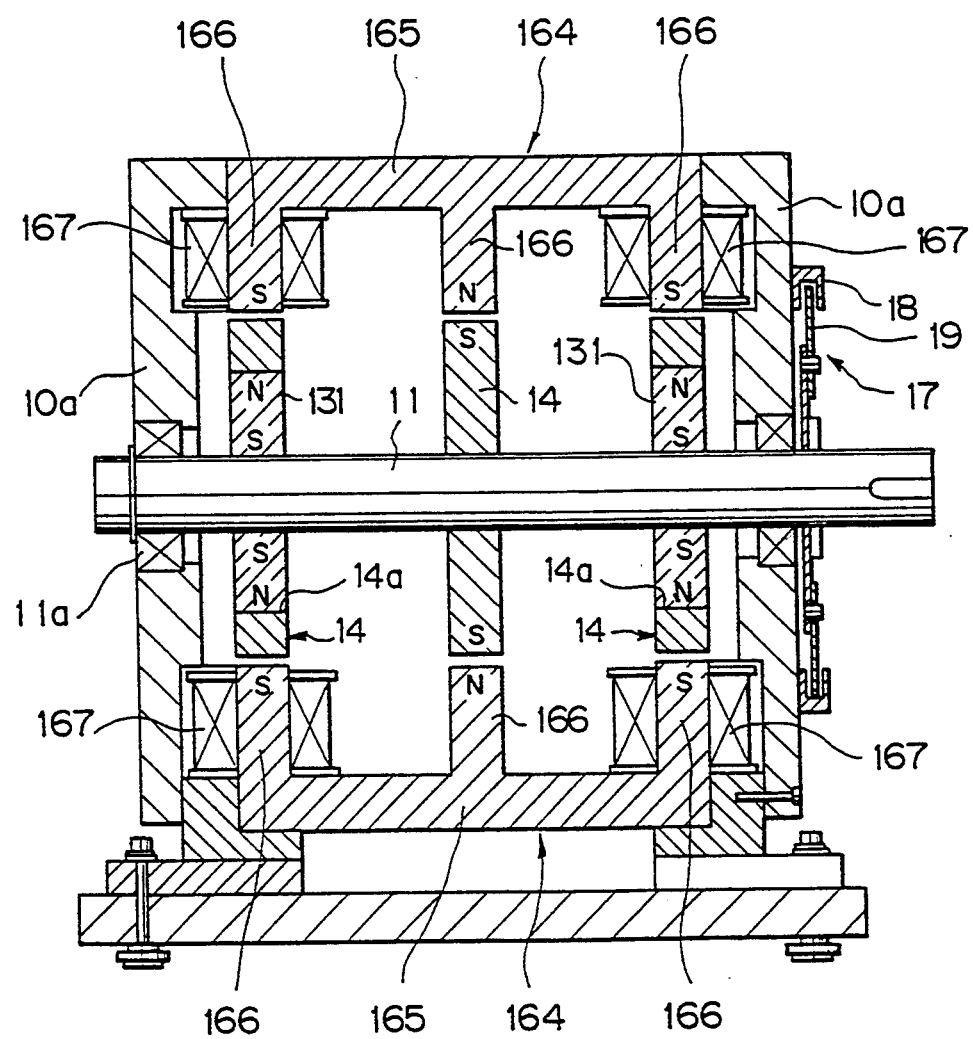

Further embodiment shown in FIG. 9 is similar to the motor shown in FIGS. 1 to 3, with three exceptions. The first exception is that a permanent magnet magnetized in the radial direction, rather than in the axial direction is employed. The permanent magnet 131 having an annular configuration has, for example, N-pole in the outer periphery and S-pole in the inner periphery. The permanent magnet 131 is received within a cavity 14e provided in the respective magnetic body 14 at the intermediate portion thereof as disposed at the axial opposite ends of the rotational output shaft 11. The second exception is that an additional magnetic body 14 is disposed at the axial midpoint of the rotational output shaft 11. Finally, the third exception is that the iron core 165 is provided with three legs 166 disposed at the axial opposite ends and the midpoint thereof, respectively, and extending toward the outer periphery of the magnetic body 14, with the legs positioned at the opposite axial ends being wound with respective coils so as to form an electromagnet 164. The remaining components are identical to those in the motor shown in FIGS. 1 to 3. The components identical to those in the motor shown in FIGS. 1 to 3 are denoted by the same reference numerals.

As shown in FIG. 9, each coil is supplied with electricity so that the legs 166 disposed at opposite axial ends of the iron core 165 are magnetized to be S-pole which is magnetically opposite to the magnetic pole (N-pole) of the confronting magnetic body 14. By this, the leg 166 disposed at the midpoint of the iron core 165 is magnetized to be N-pole which is magnetically opposite to the magnetic pole (S-pole) of the confronting magnetic body 14.

According to the embodiment described above, the rotational output shaft 11 may be formed from magnetic materials rather than non-magnetic materials. With this embodiment, it is possible to obtain the same effect as that obtained with the embodiment shown in FIG. 7.

Figure 10A:
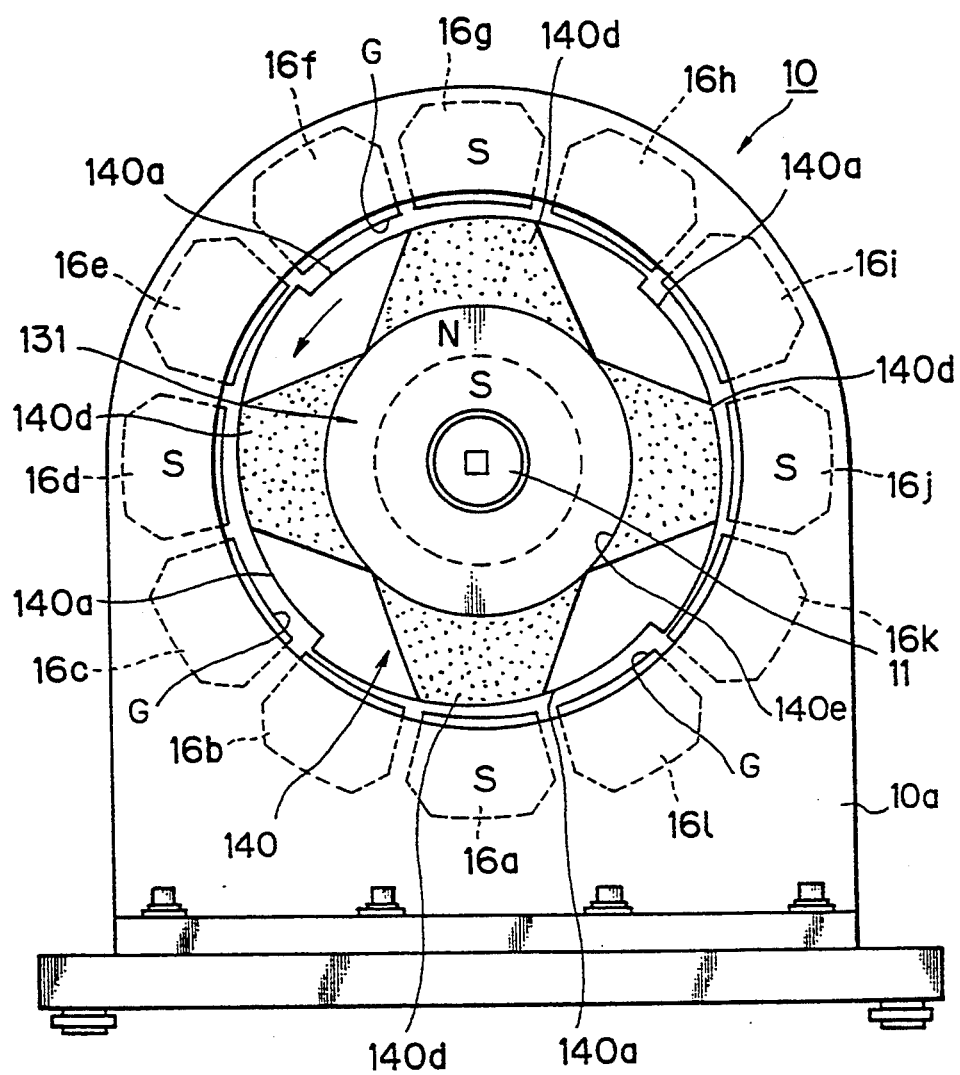
FIGS. 10A through 10C are cross-sectional views illustrating operation of the modified motor.
Figure 10B:
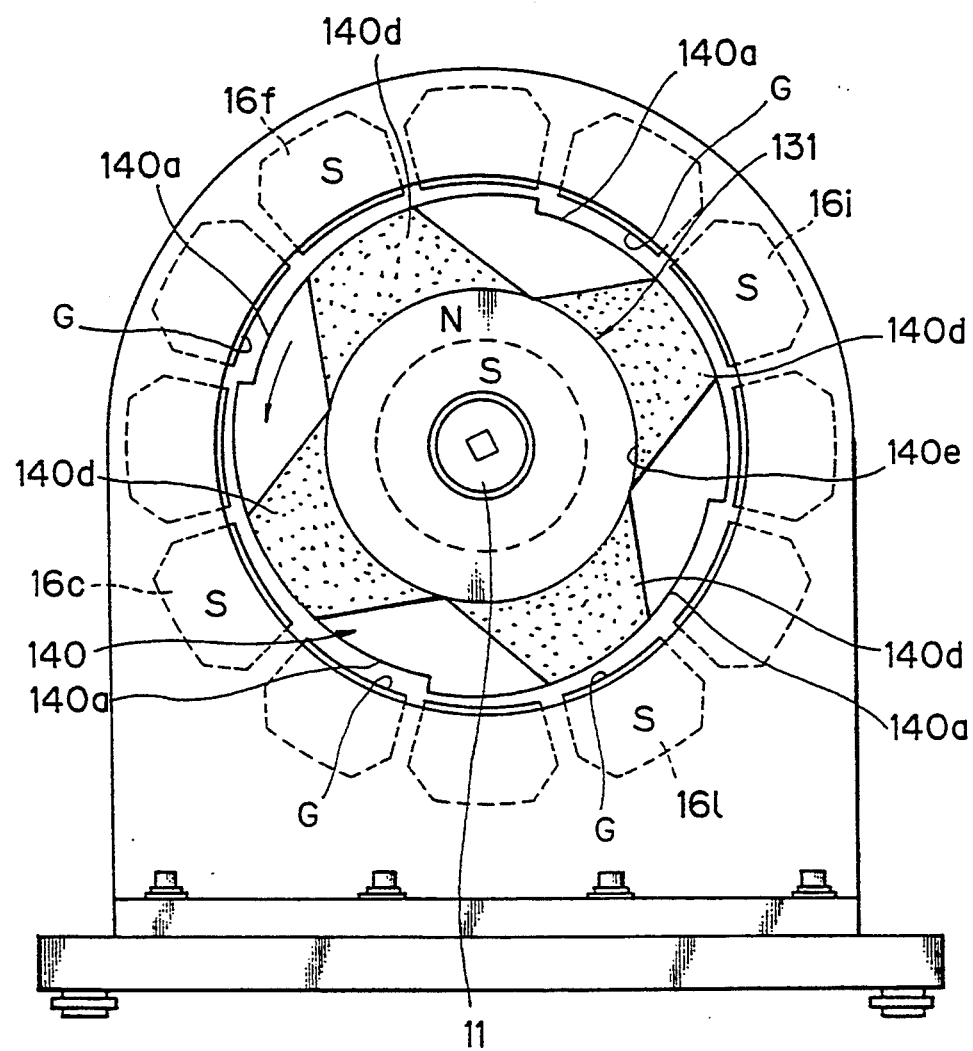
Figure 10C:
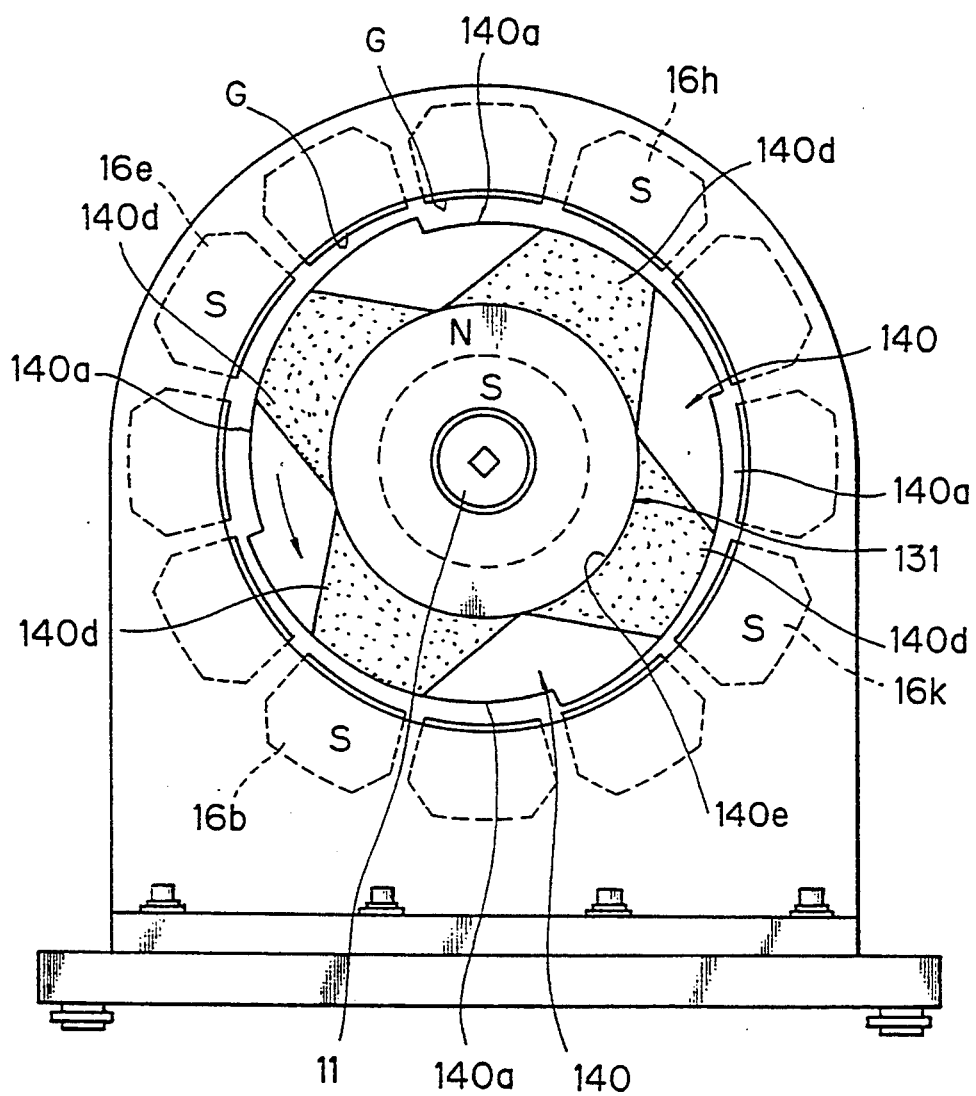

Further the alternative embodiments shown in FIGS. 10A to 10C are similar to the motor shown in FIGS. 1 to 3, with the exception that: like the embodiments shown in FIGS. 8 and 9, an annular permanent magnet 131 is employed which is received in a cavity 140e provided in the central portion 140 of the magnetic body 140; the magnetic body 140 is provided with notches 140a in the outer peripheral portion thereof, so that the gap G between the magnetic body 140 and the electromagnet becomes gradually broader in the rotational direction of the rotor; and the electromagnets confronting to the gap G with an intermediate width as positioned between the electromagnets confronting to the gap G with a narrower width and the electromagnets confronting to the gap G with a broader width are excited or magnetized in a sequential manner. The remaining components are identical to those in the motor shown in FIGS. 1 to 3. In FIGS. 10A to 10C, the components identical to those in FIGS. 1 to 3 are denoted by the same reference numerals. In this regard, it should be noted that reference numeral 140d indicates magnetic flux passing through the magnetic body 140, so as to illustrate converged condition of such magnetic flux upon excitation of the electromagnets.

In the embodiment Just described above, it is possible to rotate the rotor in the counter clockwise direction as viewed in FIG. 10A, for example, by exciting the electromagnets 16a, 16d, 16g and 16j, as shown in FIG. 10A, then, the electromagnets 16c, 16f, 16i and 16l, as shown in FIG. 10B, and then the electromagnets 16b, 16e, 16h and 16k. According to this embodiment, it is possible to obtain a stable rotational force, as well as a higher rotational torque, even though number of rotations is reduced in comparison with the above embodiment.

As shown in FIG. 10A, four (4) notches 140a are provided. It is noted, however, that two (2) or three (3) notches may be provided. It is also possible to attach the magnetic material 140 to the rotational output shaft 11 in an eccentric manner in its entirety, without providing notches 140a.

FIGS. 11A through 11H are illustrative diagrams showing the operation of the second embodiment of the invention when developed into a linear motor type.

According to this embodiment, a movable body 21 is adapted to be moved along a linear track 20 of a roller conveyor type. The track includes a frame on which a plurality of rollers are disposed in parallel relationship relative one another. A permanent magnet 22 is mounted on the movable body 21. A magnetic body 23 of a plate-like configuration is fixed to the permanent magnet 22 in the upper surface thereof, so as to form a movable element. It is noted that magnetic flux from the permanent magnet 22 passes through the magnetic body 23. A plurality of electromagnets 25a, 25b, 25c, 25d and so on are disposed above the movable element 24 along the linear track and in a parallel relationship relative one another. The electromagnets constitute a stator 25. Magnetic circuits of the electromagnets 25a, 25b, 25c, 25d, and so on, are independent from one another, so that the electromagnets are magnetized in a sequential manner by means of excitation change-over means (not shown), so as to have a magnetic polarity opposite to the magnetic pole of the permanent magnet 22. Power output shafts 21a are attached to a side surface of the movable body 21.

Operation of the above second embodiment will be explained below.

Figure 11A:
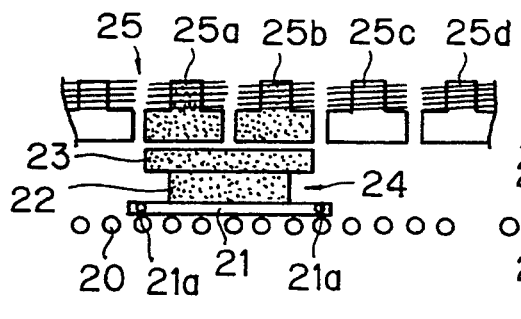
FIGS. 11A through 11H are illustrative diagrams showing operation of a motor in a form of a linear motor according to a second embodiment of the invention.

As shown in FIG. 11A, and when no electricity is supplied to the electromagnets, the electromagnets 25a and 25b positioned just above the movable element 24 are subjected to magnetic field of the permanent magnet 22 (refer to shaded portion in FIG. 11A). Thus, such electromagnets magnetically absorb the magnetic body 23 thereto, so that the movable element 24 remains to be stopped.

Figure 11B:
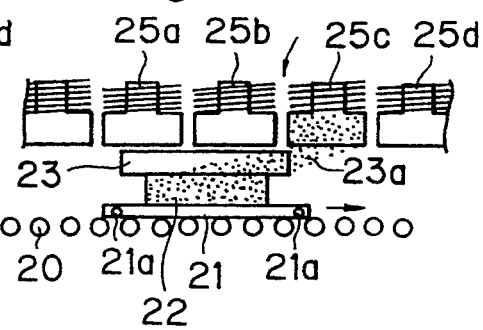

As shown in FIG. 11B, and when the electromagnet 25c, positioned forwardly with respect to the direction in which the movable element 24 moves, is excited, the magnetic field of the permanent magnet 22 and the magnetic field of the electromagnet 25c interact with each other, so that magnetic flux 23a passing through the magnetic body 23 converges instantaneously toward the electromagnet 25c. By this, the movable element 24 is magnetically absorbed to the electromagnet 25c, so that it is moved along the linear track 20 under the propulsive force acting in the direction in which the width of the magnetic flux 23a becomes broader, i.e., in the direction of an arrow mark shown in FIG. 11B.

Figure 11C:
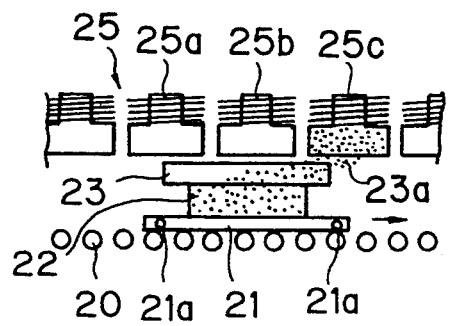
Figure 11D:
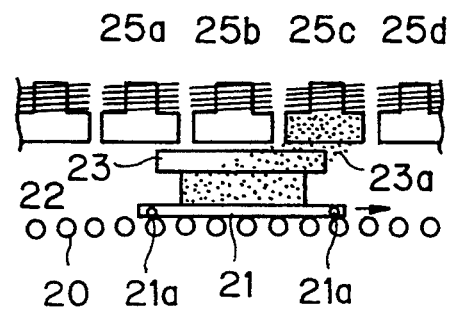
Figure 11E:
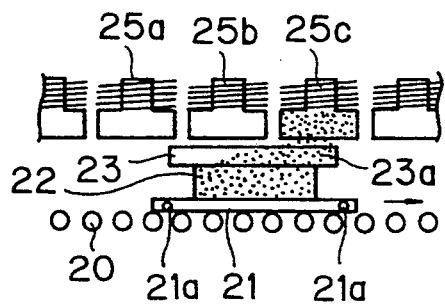

FIGS. 11C through 11E illustrate a change in width of the magnetic flux 23a in response to movement of the movable element 24. At the point at which the width of the magnetic flux 23a becomes maximized, i.e., when the forward end of the magnetic material 23 of the movable element 24 is positioned just before passing by the electromagnet 25c, the width of the flux 23 becomes maximized. At this time, magnetic absorption acting between the permanent magnet 22 and the electromagnet 25c becomes maximized, but the propulsive force acting on the movable element becomes zero.

Figure 11F:
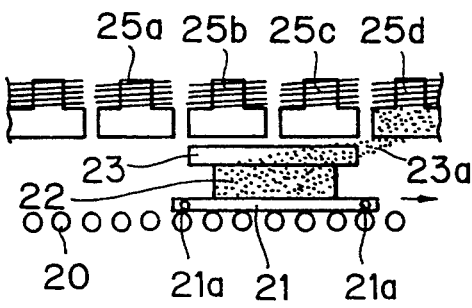

Before the propulsive force acting on the movable element 24 becomes completely zero, i.e., when the forward end of the magnetic body 23 of the movable element 24 is about to pass the electromagnet 25d, the excitation changeover means is actuated so as to stop excitation of the electromagnet 25c and so as to initiate excitation of the electromagnet 25d. Thus, the magnetic flux 23a converges to the electromagnet 25d, as shown in FIG. 11F, so that a propulsive force acts on the movable element 24, as in the previous stage.

Figure 11G:
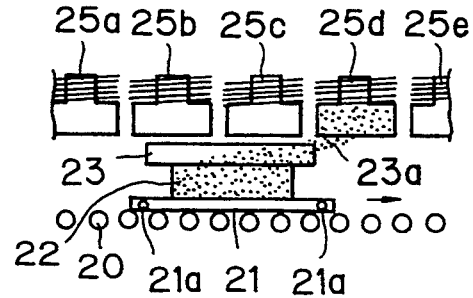
Figure 11H:
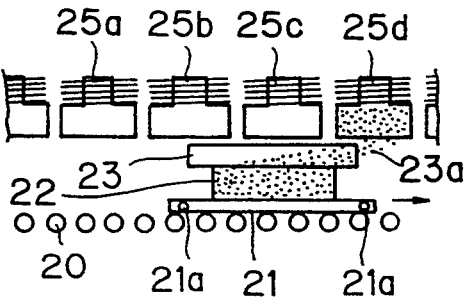
Figure 12:
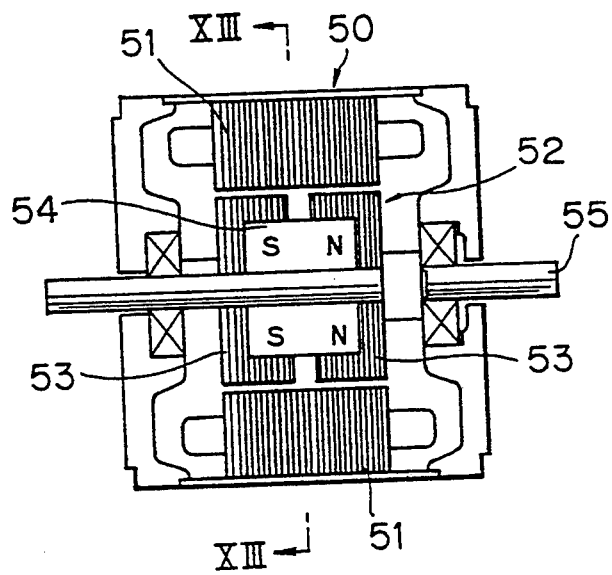
FIG. 12 is a cross-sectional view of a conventional HB type step motor.
Figure 13:
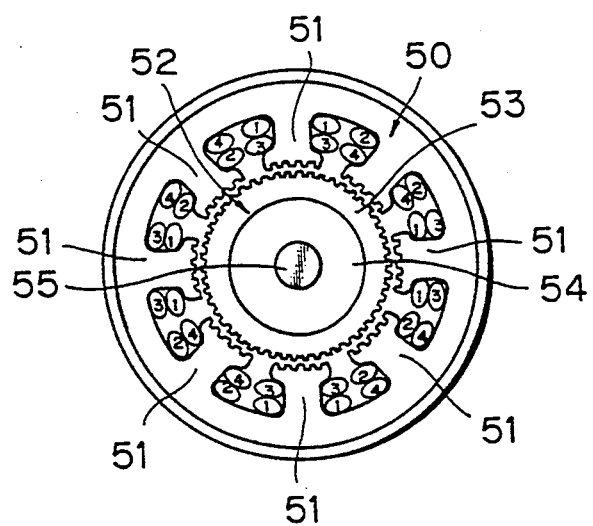
FIG. 13 is a cross-sectional view along line XIII—XIII in FIG. 12.
Figure 14:
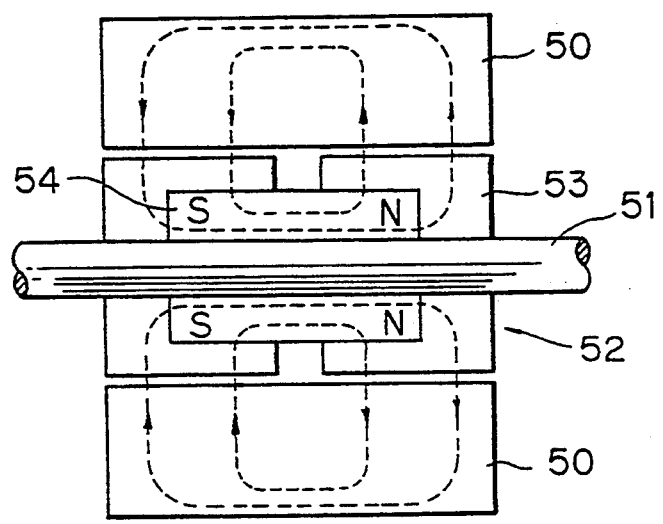
FIG. 14 is an illustrative view showing a magnetic path of the permanent magnet of the motor shown in FIG. 12.
Figure 15:
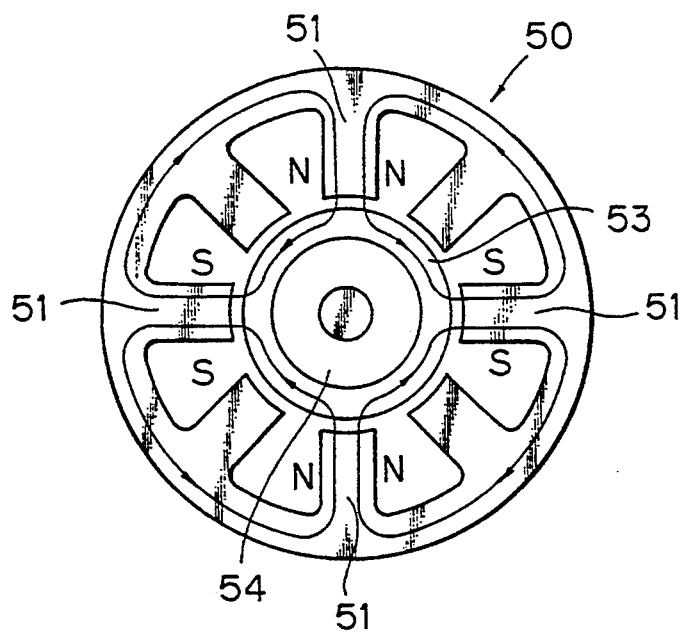
FIG. 15 is an illustrative view showing magnetic path of the electromagnet of the motor shown in FIG. 12.
Figure 16:
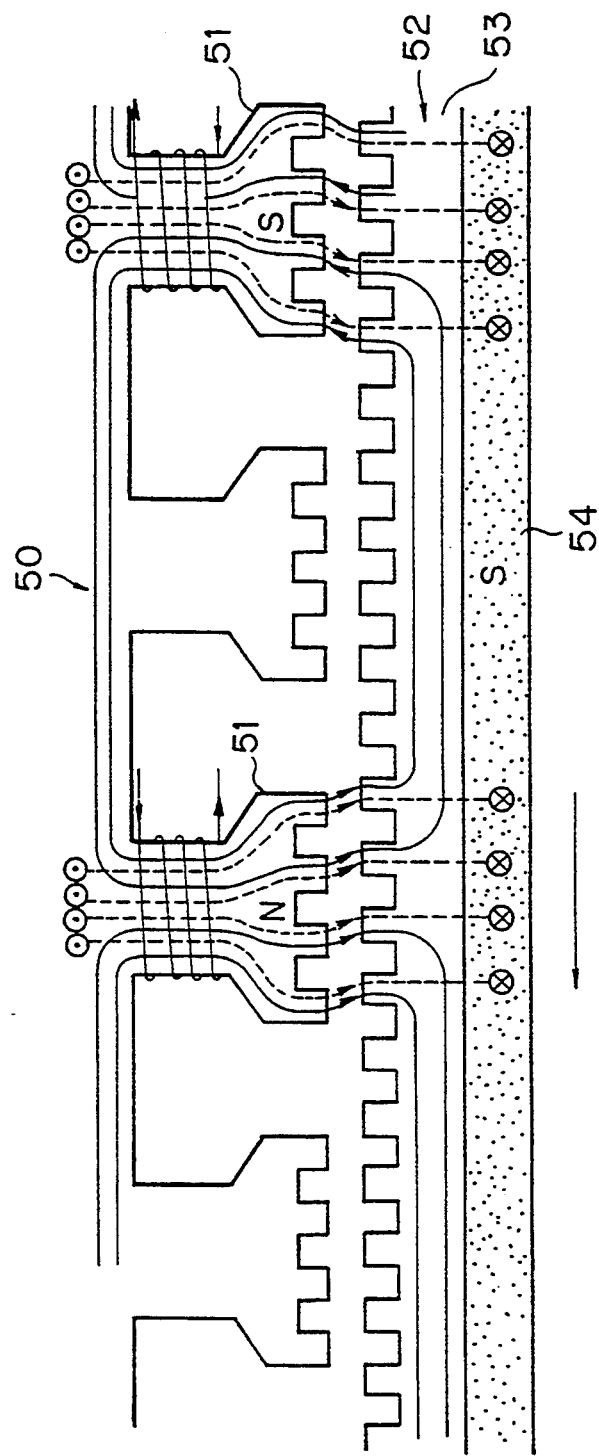
FIG. 16 is an illustrative view showing interaction between the magnetic field of the permanent magnet at the S-side thereof and the magnetic field of the electromagnet of the motor shown in FIG. 12.
Figure 17:
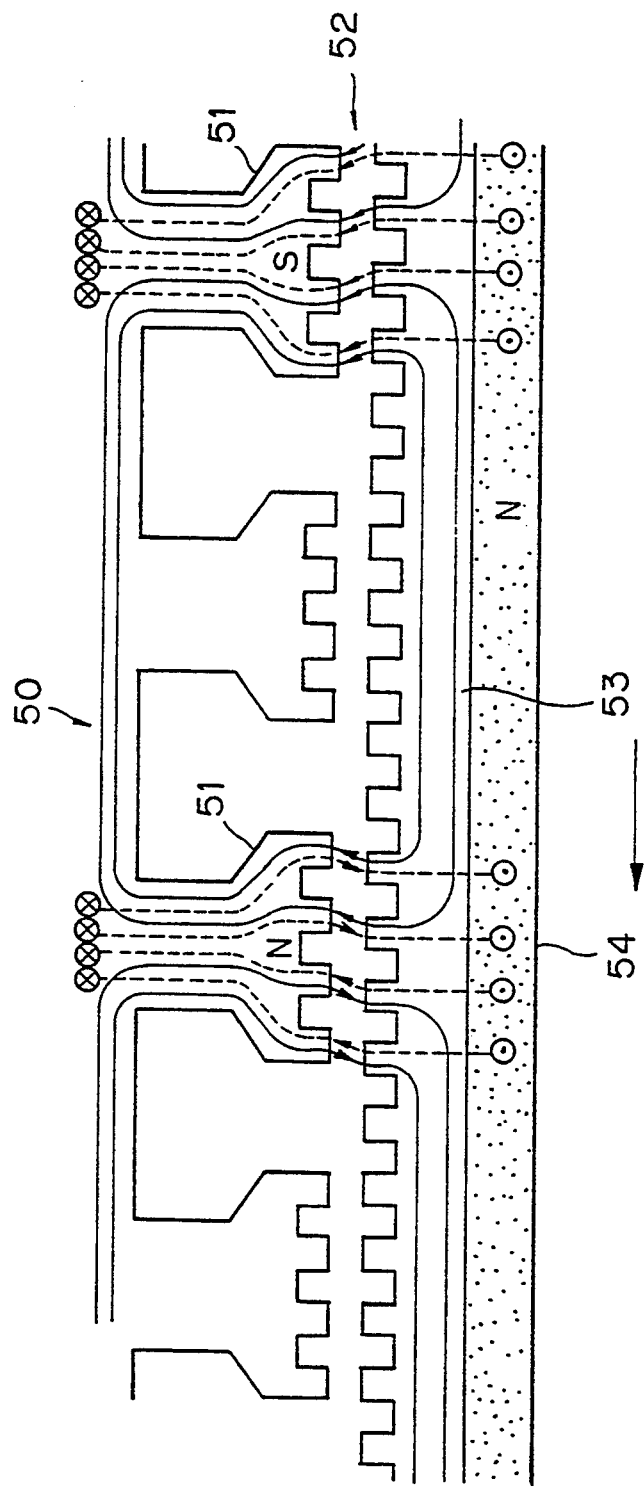
FIG. 17 is an illustrative view showing interaction between the magnetic field of the permanent magnet at the N-side thereof and the magnetic field of the electromagnet of the motor shown in FIG. 12.

Subsequently, and in response to further movement of the movable element 24, the width of the magnetic flux 23a is reduced as shown in FIGS. 11G and 11H, and thus a similar operation will be repeated.

The sequential excitation of the electromagnets, as explained above, causes interaction between the magnetic fields of permanent magnet 22 and electromagnets, whereby a propulsive force is applied to the movable element 24.

It is noted that, when the magnetic polarity of the permanent magnet 22 confronting the electromagnets is assumed to be N-pole, the electromagnet 25c is magnetized solely to be S-pole, so as to prevent formation of a magnetic circuit by virtue of passage of magnetic flux from the electromagnet 25c through to the adjacent electromagnets 25b and 25d, which formation, if it occurs, tends to cause the polarity of the electromagnets to be N-pole identical to the magnetic pole of the permanent magnet 22. Accordingly, and in a manner similar to that in the first embodiment, no force is generated which tends to interfere with movement of the movable element 24.

In the present invention, a plurality of electromagnets serving as a stator are so arranged that their respective magnetic circuits become independent from one another. The electromagnets are also arranged so that they are solely magnetized or excited to have a magnetic polarity opposite to the magnetic pole of the confronting permanent magnet. Thus, each electromagnet is prevented from becoming magnetized to the same polarity as that of the permanent magnet, which may occur when magnetic flux from a particular electromagnet passes through to adjacent electromagnets. Accordingly, no force will be exerted which tends to interfere with the intended movement of a rotor or a movable element. As a result, electric energy applied to the electromagnets may be efficiently utilized, while, at the same time, magnetic energy contained in the permanent magnet may also be efficiently utilized.

The coils constituting the electromagnets are consistently supplied with electric current with the same polarity, without any change, so that heating of coils may be prevented. Further, it is possible to obviate the problems of vibration and noise which might occur due to a repulsive force being generated when polarity of an electric current supplied to the coils is changed.

What is claimed is:

1. A motive power generating device for transforming magnetic energy into motive power comprising:
   a stationary support member;
   an output shaft rotatably mounted on the support member;
   a permanent magnet disposed around the rotational output shaft for rotation therewith;
   a magnetic body disposed in concentric relationship with said permanent magnet for rotation with said rotational output shaft, said magnetic body being subjected to the magnetic flux of said permanent magnet;

a plurality of electromagnets fixedly mounted on said support member in such a manner that they are spaced a predetermined distance apart around the periphery of said magnetic body, each magnetic circuit of said electromagnets being adapted to be independent of one another;

said magnetic body including magnetic notches and teeth which are disposed alternately in an outer peripheral portion thereof, each said tooth having an outer corner which is forwardly positioned in the rotational direction and has an acute angle configuration so as to cause further convergence of the magnetic flux;

certain of said electromagnets being disposed at positions corresponding to boundary portions between said notches and said magnetic teeth; and excitation change-over means for said electromagnets to sequentially magnetize one of said electromagnets which is positioned forwardly in the direction of rotation with regard to the outer corner of the tooth so as to give said particular electromagnet a magnetic polarity magnetically opposite to that of the magnetic pole of said permanent magnet, whereby magnetic flux passing through said magnetic body is converged in one direction so as to apply a rotational torque to said rotational output shaft.

2. A motive power generating device in accordance with claim 1 wherein:

said excitation change-over means includes a plurality of sensors mounted to said support member at positions corresponding to said plurality of electromagnets, and an ON-OFF member mounted on said rotational output shaft for turning said sensors on and off in response to rotation of said output shaft.

3. A motive power generating device in accordance with claim 1, wherein:

said magnetic body includes three magnetic notches and three magnetic teeth which are disposed alternately in the outer peripheral portion thereof;

six (6) in twelve (12) of said electromagnets are disposed at positions corresponding to the boundary portions between said notches and said magnetic teeth; and said excitation change-over means is adapted to sequentially magnetize three (3) in six (6) of said electromagnets, disposed at positions corresponding to said boundary portions between said notches and said magnetic teeth, that are positioned forwardly with respect to a rotational direction of said output shaft, so as to impart to said three electromagnets a magnetic polarity opposite to that of the magnetic pole of said permanent magnet.

4. A motive power generating device in accordance with any one of claims 1 or 3, wherein:

said electromagnets are arranged in parallel with said rotational output shaft; and said permanent magnet and said magnetic body are disposed at opposite axial ends of said rotational output shaft in confronting relationship with respective axial ends of each of said electromagnets.

5. A motive power generating device in accordance with claim 4, wherein:

each of said electromagnets includes a pair of legs disposed at opposite axial ends of an iron core and extending toward the outer periphery of said magnetic body, and a coil wound around each of said legs.

6. A motive power generating device in accordance with any one of claims 1 or 3, wherein:

a plurality of said magnetic bodies are attached to the opposite axial ends and intermediate portion therebetween, respectively, of said rotational output shaft;

a permanent magnet magnetized in the axial direction is disposed between said first magnetic body located at one axial end of said output shaft and said third magnetic body located at said intermediate portion of said output shaft, and between said second magnetic body located at the other axial end of said output shaft and said third magnetic body;

the magnetic pole of said one permanent magnet adjacent to said third magnetic body and the magnetic pole of the other permanent magnet adjacent to said third magnetic body have the same magnetic polarity; and each of said electromagnets includes legs positioned at said axial opposite ends and intermediate portion of an iron core and extending toward the outer peripheries of said first, second and third magnetic bodies, respectively, and a coil wound around each of said legs located at the axial opposite ends of said iron core.

7. A motive power generating device in accordance with claim 4, wherein:

said magnetic body includes a cavity in the intermediate portion thereof; and said permanent magnet has an annular configuration and is received in said cavity, said permanent magnet being magnetized so as to have an opposite polarity in the inner periphery to that of the outer periphery.

8. A motive power generating device in accordance with claim 6, wherein:

said first and second magnetic bodies include a cavity in their respective intermediate portions, respectively;

each of said permanent magnets has an annular configuration and is received in said corresponding one of the cavities in said first and second magnetic bodies, each of said permanent magnets being magnetized so as to have an opposite polarity in the inner periphery to that of the outer periphery.

9. A motive power generating device for transforming magnetic energy into motive power comprising:

a stationary support member;

an output shaft rotatably mounted on the support member;

a permanent magnet disposed around the rotational output shaft for rotation therewith:

a magnetic body disposed in concentric relationship with said permanent magnet for rotation with said rotational output shaft, said magnetic body being subjected to the magnetic flux of said permanent magnet;

a plurality of electromagnets fixedly mounted on said support member in such a manner that they are spaced a predetermined distance around the periphery of said magnetic body, each magnetic circuit of said electromagnets being adapted to be independent of one another;

said magnetic body including a plurality of notches in the outer peripheral portion thereof, each of said notches being configured so as to gradually increase a gap between said magnetic body and said electromagnets in the rotational direction of said rotor; and excitation change-over means to sequentially magnetize the electromagnets confronting a gap with an intermediate width which are disposed between the electromagnets confronting a gap with a narrower width and a gap with a broader width, so as to impart to them a magnetic polarity opposite to that of the magnetic pole of said permanent magnet whereby magnetic flux passing through said magnetic body is converged in one direction so as to apply a rotational torque to said rotational output shaft.

10. A motive power generating device in accordance with claim 9, wherein:

each of said electromagnets includes a pair of legs disposed at the axial opposite ends of an iron core and extending toward the outer periphery of said magnetic body, and a coil wound around each of said legs.

11. A motive power generation device in accordance with claim 9, wherein:

said magnetic body includes a cavity in the intermediate portion thereof; and said permanent magnet has an annular configuration and is received in said cavity, said permanent magnet being magnetized so as to have an opposite polarity in the inner periphery to that of the outer periphery.

12. A motive power generating device in accordance with claim 9, wherein:

a plurality of said magnetic bodies are attached to the opposite axial ends and intermediate portion therebetween, respectively, of said rotational output shaft;

a permanent magnet magnetized in the axial direction is disposed between said first magnetic body located at one axial end of said output shaft and said third magnetic body located at said intermediate portion of said output shaft, and between said second magnetic body located at the other axial end of said output shaft and said third magnetic body;

the magnetic pole of said one permanent magnet adjacent to said third magnetic body and the magnetic pole of the other permanent magnet adjacent to said third magnetic body have the same magnetic polarity; and each of said electromagnets includes lees positioned at said axial opposite ends and intermediate portion of an iron core and extending toward the outer peripheries of said first, second and third magnetic bodies, respectively, and a coil wound around each of said legs located at the axial opposite ends of said iron core.

13. A motive power generation device in accordance with any one of the claims 9, 10, 11 and 12, wherein:

said device includes two (2), three (3) or four (4) of said notches.

14. A motive power generating device in accordance with claim 9, wherein:

said excitation change-over means includes a plurality of sensors mounted to said support member at positions corresponding to said plurality of electromagnets, and an ON-OFF member mounted on said rotational output shaft for turning said sensors on and off in response to rotation of said output shaft.

15. A motive power generating device in accordance with claim 2, wherein:

each of said sensor comprises an optical sensor including a light receiving element and a light emitting element, said elements being oppositely disposed with a predetermined distance therebetween; and said ON-OFF member includes a light shield plate disposed between said light receiving element and said light emitting element.

16. A motive power generating device in accordance with claim 14, wherein:

each of said sensor comprises an optical sensor including a light receiving element and a light emitting element, said elements being oppositely disposed with a predetermined distance therebetween; and said ON-OFF member includes a light shield plate disposed between said light receiving element and said light emitting element.

* * * * *

UNITED STATES PATENT AND TRADEMARK OFFICE
CERTIFICATE OF CORRECTION

PATENT NO. : 5 436 518
DATED : July 25, 1995
INVENTOR(S) : Teruo Kawai

It is certified that error appears in the above-indentified patent and that said Letters Patent is hereby corrected as shown below:

Column 14, line 54; change "therewith:" to ---therewith;---.

Column 16, line 4; change "lees" to ---legs---.

Signed and Sealed this

Fourteenth Day of November, 1995

Attest:

BRUCE LEHMAN

Attesting Officer

Commissioner of Patents and Trademarks